No. 723,831. PATENTED MAR. 31, 1903.
A. L. COLE.
SEMIMETALLIC PACKING.
APPLICATION FILED OCT. 7, 1901.
NO MODEL.
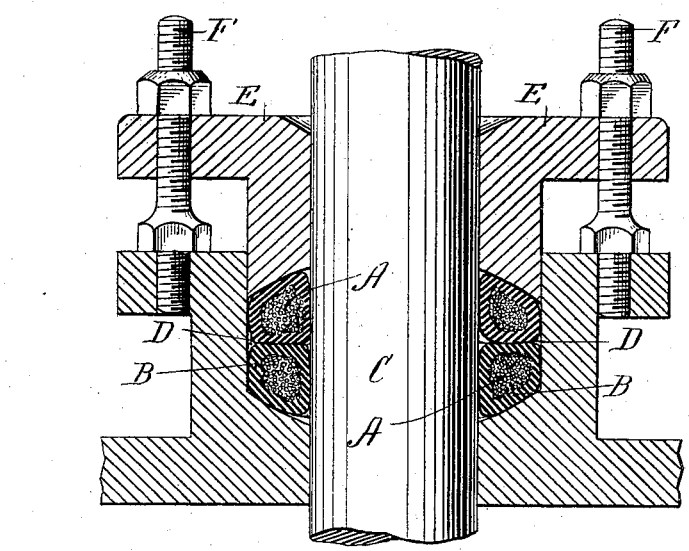
*Fig. 1.*
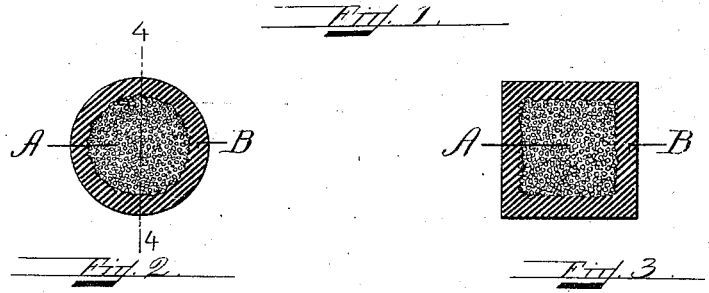
*Fig. 2.* *Fig. 3.*
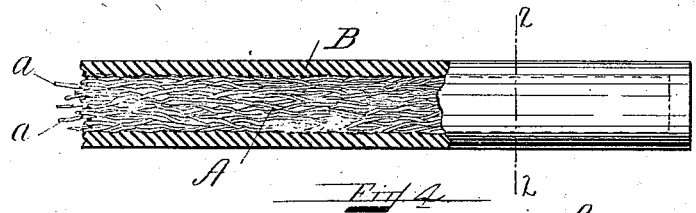
*Fig. 4.*
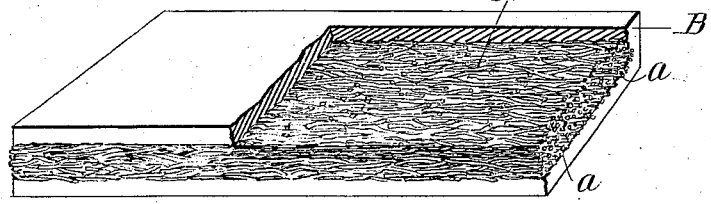
*Fig. 5.*
Witnesses:
Inventor:
Albert L. Cole
by Francis J. V. Dakin
Attorney

UNITED STATES PATENT OFFICE.

ALBERT L. COLE, OF WEST NEWTON, MASSACHUSETTS, ASSIGNOR TO STANDARD PACKING MANUFACTURING COMPANY, A CORPORATION OF MAINE.

SEMIMETALLIC PACKING.

SPECIFICATION forming part of Letters Patent No. 723,831, dated March 31, 1903.

Application filed October 7, 1901. Serial No. 77,761. (No model.)

*To all whom it may concern:*

Be it known that I, ALBERT L. COLE, a citizen of the United States, residing at West Newton, in the county of Middlesex and State of Massachusetts, have invented certain new and useful Improvements in Semimetallic Packing, of which the following is a specification, reference being had therein to the accompanying drawings.

My invention relates to improvements in semimetallic packing composed of a core of shredded soft metal covered with rubber impregnated with a lubricant and is designed for use on piston-rods and plungers in steam or other engines or pumps in places where high pressures of steam and of other gases or fluids are used.

My invention has for its object the production of an efficient and durable packing, especially when subjected in use to high pressures.

The following is a clear description of my invention, reference being made to the accompanying drawings, in which—

Figure 1 is a vertical transverse section of a stuffing-box, showing the application of the packing to a piston-rod. Fig. 2 is a transverse section on the line 2 2 in Fig. 4 of the packing made in the round form. Fig. 3 is a transverse section of packing made in the square form. Fig. 4 is a longitudinal vertical section on the line 4 4 in Fig. 2 and elevation of the packing made in the round form. Fig. 5 is a view in perspective with a section cut away, showing the construction of the packing in sheet form.

Similar letters refer to similar parts throughout the several views.

My semimetallic packing is made as follows: I first take a soft flexible antifriction metal, such as Babbitt metal, which will not score a piston-rod, and shred it by drawing out. These metallic shreds *a a* I use to form the metallic core A of my packing. The shreds *a a* are bunched tightly together the desired size of the core A and are then ready for the rubber covering B. If desired, the core may be made of metal in the form of ribbons or blocks or any other shape instead of shreds. To make the covering B, I use crude rubber in a soft state and mix with it graphite or some other suitable lubricant and knead them together thoroughly until the rubber is well impregnated with the graphite. Heretofore in packings it has been impracticable to use rubber next to the working parts on account of its corrosive effect on those parts; but by mixing graphite with the rubber this difficulty is overcome and the graphite acts as a lubricant and prevents the rubber covering, which is in contact with the working parts, adhering to or corroding those parts even when they become heated. There are no specified proportions in which to mix the rubber and the graphite; but I have found in my experience that a covering consisting of about eighty-five per cent. of rubber and about fifteen per cent. of graphite is self-lubricating and will not adhere to or corrode the working parts. After the rubber and graphite have been thoroughly kneaded together the mixture is then spread in a mold the desired thickness of the covering. For this purpose I employ a mold similar to that used for vulcanizing rubber heels, but of a form which will give the desired shape of packing, which can be made in a great variety of forms. The thickness of the covering B is also determined at this stage, and it may be made either thin or thick, according to the use to be made of the finished packing. I next place the shredded metallic core in the mold on the rubber and envelop it completely with the rubber covering, and the whole is subjected to a heavy pressure for the purpose of making the core compact and forcing the rubber in between the outside shreds of the core. Thus the packing is made in a solid body and will not separate when partially worn out. After being pressed the mold is placed in any ordinary vulcanizer and the packing is subjected to a baking of from ten to thirty minutes. The length of time depends upon the kind of packing desired. In order to secure a packing which is very flexible, with a soft covering, I bake it ten or fifteen minutes only; but to get a packing with a hard brittle covering it is necessary to vulcanize it for thirty minutes or more. When taken from the mold the packing is ready for use.

In Fig. 1 is an illustration of the application of the packing to the piston-rod C, the packing being placed within the stuffing-box D and compressed against the piston-rod by the gland E, operated by the stud-bolts F F. One or more rings of packing may be used. As the piston works there is no friction from the rubber covering, because the graphite acts as a perfect lubricant even when the piston becomes hot, and as the covering wears away the gland is tightened, and the piston forms a seat which is absolutely steam-tight. When the piston has gradually worn away the rubber covering, it exposes the metal core; but that being of soft metal will not score the piston-rod and will operate as a metal packing with a tight-fitting joint which does not permit the escape of steam. In this way the packing becomes very durable and efficient.

This semimetallic packing combines all the good features of both metallic and soft-fabric packings without any of their disadvantages. It can be made in any size and in any form desired, it being necessary to provide a suitable mold only. If desired, it can be made in sheet form, and gaskets of any size and form may be cut out with a stamp.

My packing can be made soft, like a fabric packing, or hard, resembling a metal packing, according to the use for which it is designed. For example, if the core is made large and a thin covering put on and baked hard and brittle it can be made more efficient than a metal packing, for the reason that the rubber covering next to the working parts being brittle soon wears away, leaving a metal contact, and the core being held together by the remaining parts of the cover possesses just enough flexibility, which is lacking in a metal ring-packing, to respond readily to the pressure of the gland, and thereby to form a steam-tight joint.

Obviously my invention can be embodied in many different forms without departing from the spirit thereof, and I desire to claim my invention in the broadest manner legally possible.

What I claim is—

1. A packing consisting of a core of metal threads, said threads being arranged lengthwise of the core, and a matrix of a composition of rubber and graphite, said matrix being pressed and vulcanized to the core to hold the metal threads thereof together, substantially as described.

2. A packing consisting of a core of metal threads and a covering of a composition of rubber and graphite, said covering being pressed into the interstices of said core and vulcanized.

3. A packing consisting of a core of metal threads and a matrix of a composition of rubber and graphite; said matrix filling up the interstices in said core and intermingling with said metal threads and being pressed and vulcanized to hold firmly together the metal threads of said core.

In testimony whereof I affix my signature in the presence of two witnesses.

ALBERT L. COLE.

Witnesses:
ARTHUR J. SELFRIDGE,
MATTIE A. PROUTY.